July 31, 1923. 1,463,636
W. STRICKER
AUTOMATIC FOOD MOLDING AND WRAPPING MACHINE
Filed Feb. 19, 1921 9 Sheets-Sheet 1

WITNESSES:
Fred C. Fischer.

INVENTOR:
William Stricker.
BY
F. G. Fischer,
ATTORNEY.

July 31, 1923.

W. STRICKER 1,463,636

AUTOMATIC FOOD MOLDING AND WRAPPING MACHINE

Filed Feb. 19, 1921

WITNESSES:
Fred C. Fischer

INVENTOR:
William Stricker,
BY F. G. Fischer,
ATTORNEY.

July 31, 1923.

W. STRICKER

AUTOMATIC FOOD MOLDING AND WRAPPING MACHINE

Filed Feb. 19, 1921

WITNESSES:
Fred C. Fischer,

INVENTOR
William Stricker,
BY
F. G. Fischer
ATTORNEY.

July 31, 1923.
W. STRICKER
1,463,636
AUTOMATIC FOOD MOLDING AND WRAPPING MACHINE
Filed Feb. 19, 1921
9 Sheets-Sheet 6
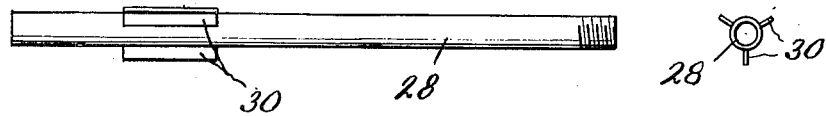
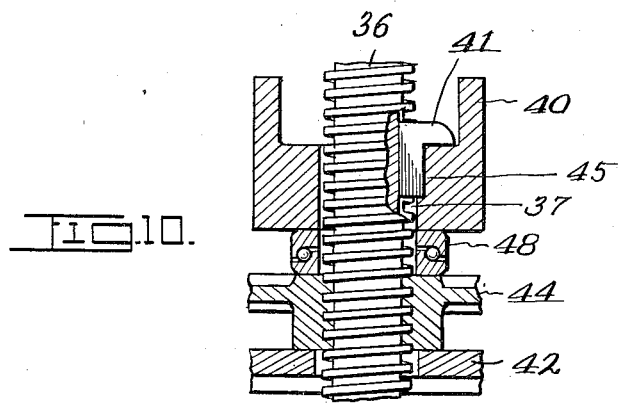
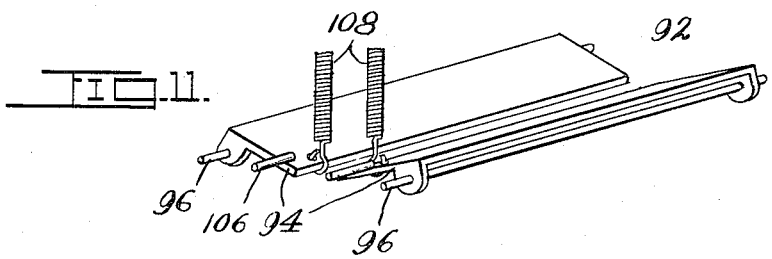
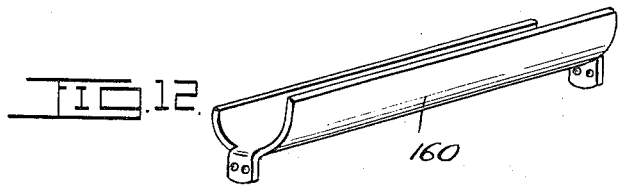
WITNESSES:
Fred G. Fischer.
INVENTOR:
William Stricker,
BY F. G. Fischer,
ATTORNEY

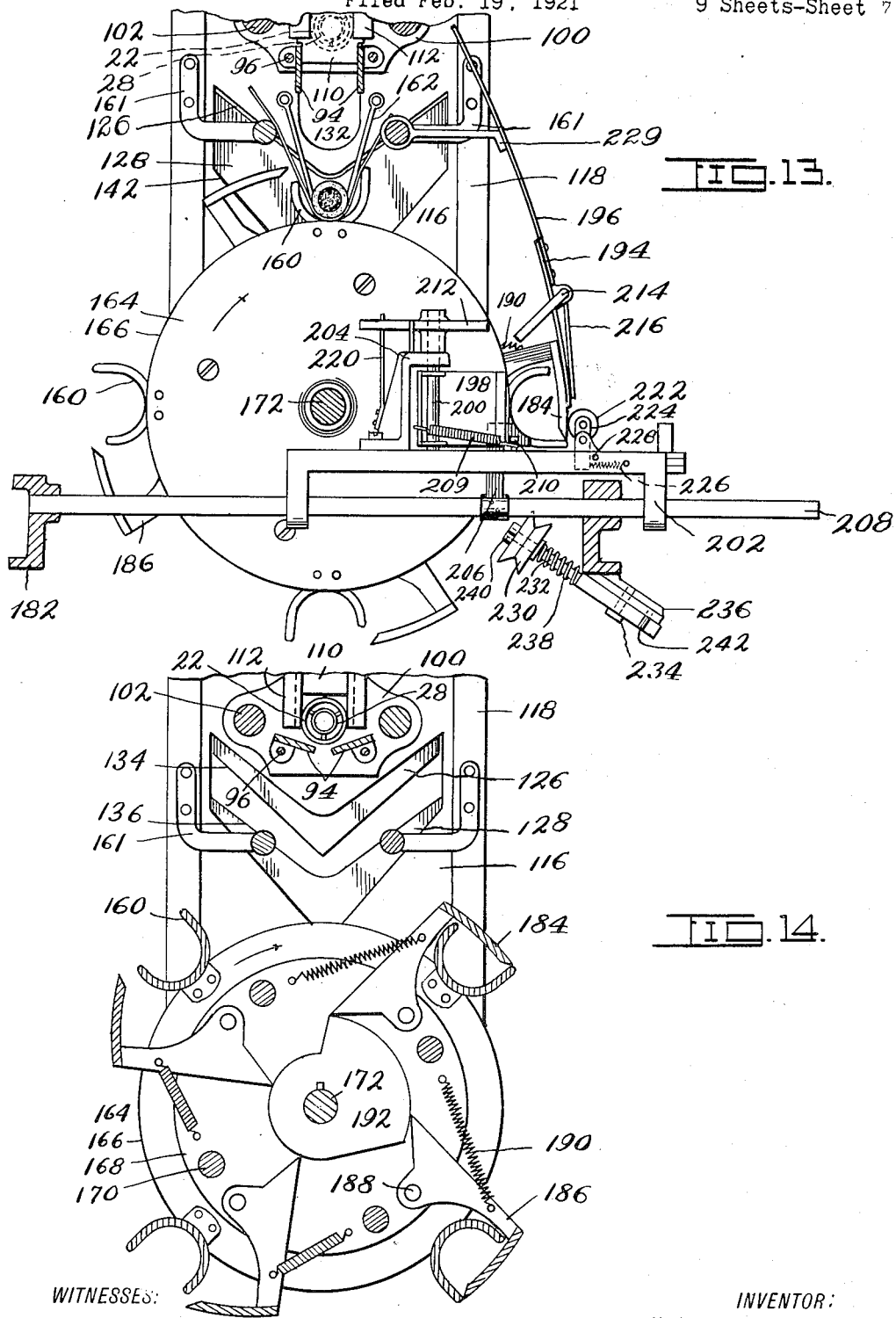

July 31, 1923.
W. STRICKER
1,463,636
AUTOMATIC FOOD MOLDING AND WRAPPING MACHINE
Filed Feb. 19, 1921    9 Sheets-Sheet 8
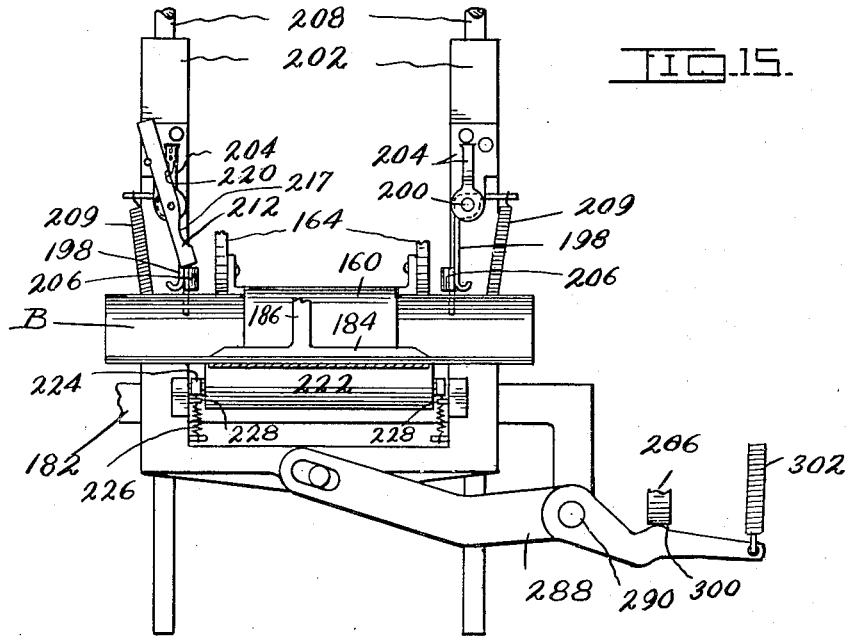
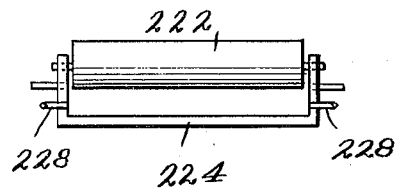
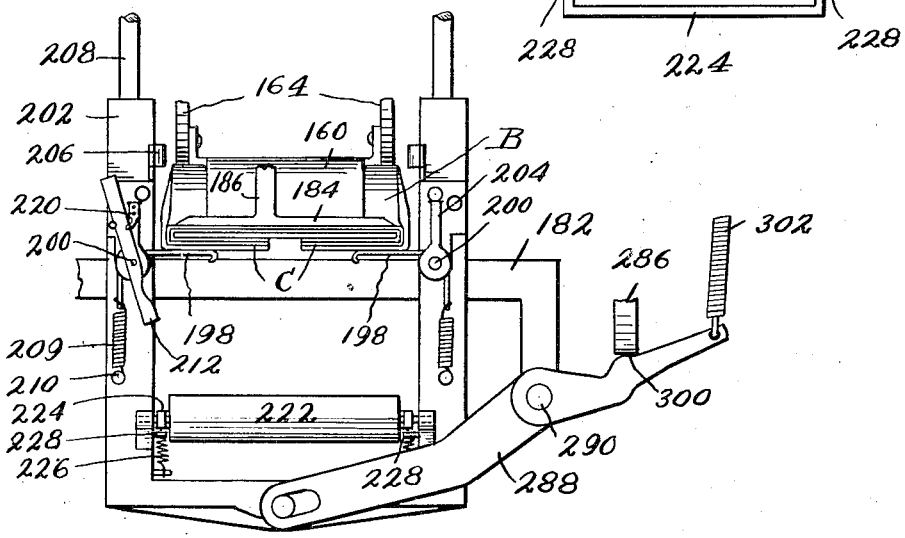
WITNESSES:
Fred C. Fischer,
INVENTOR:
William Stricker,
BY
F. G. Fischer,
ATTORNEY.

July 31, 1923.
W. STRICKER
1,463,636
AUTOMATIC FOOD MOLDING AND WRAPPING MACHINE
Filed Feb. 19, 1921
9 Sheets-Sheet 9
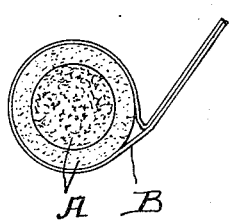
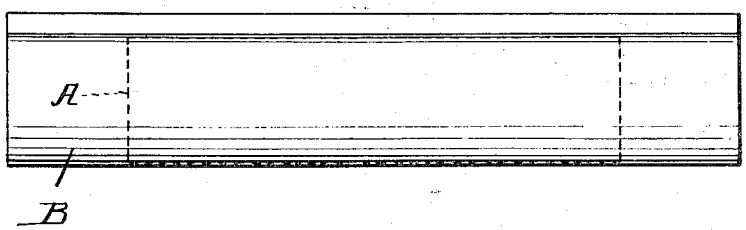
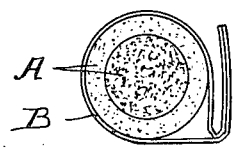
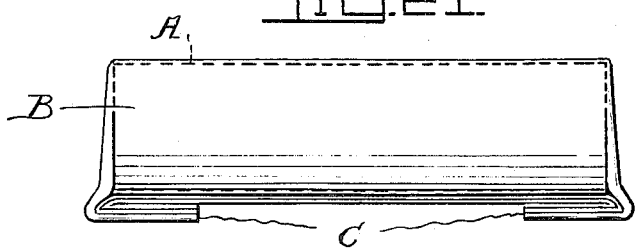
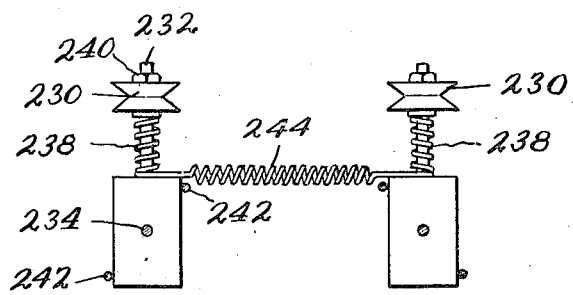
Witness:
Fred C. Fischer
Inventor:
William Stricker,
By F. G. Fischer,
Attorney Patented July 31, 1923.

1,463,636

UNITED STATES PATENT OFFICE.

WILLIAM STRICKER, OF KANSAS CITY, MISSOURI.

AUTOMATIC FOOD MOLDING AND WRAPPING MACHINE.

Application filed February 19, 1921. Serial No. 446,377.

*To all whom it may concern:*

Be it known that I, WILLIAM STRICKER, a citizen of the United States, residing at Kansas City, in the county of Jackson and State of Missouri, have invented certain new and useful Improvements in Automatic Food Molding and Wrapping Machines, of which the following is a specification.

My invention relates to new and useful machines for forming and wrapping tomales, candies and other confections, and one feature of the invention resides in novel means for forming a core of one kind of material, such as prepared meats, and surrounding said core with a jacket formed from another kind of material, such, for instance, as cornmeal mush.

In its preferred embodiment the machine consists briefly of an organization of coacting parts which mold the material into the desired form, cut the molded material into suitable lengths, cuts wrappers into proper lengths from a roll of paper or the like and folds a wrapper around each length of material.

In order that the invention may be fully understood, reference will now be had to the accompanying drawings, in which:

Fig. 8 is a side elevation of an interior nozzle.

Fig. 9 is an end view of said interior nozzle.

Fig. 10 is an enlarged broken sectional view on line X—X of Fig. 1.

Fig. 11 is a detail perspective view of a tray.

Fig. 12 is a detail perspective view of a receiver.

Fig. 13 is an enlarged broken elevation partly in section, of mechanism at the forward end of the machine.

Fig. 14 is a vertical section of certain of the parts disclosed by Fig. 13 and taken on line XIV—XIX of Fig. 1.

Fig. 15 is a plan view of a carriage and associated parts, said carriage being in its forward position.

Fig. 16 is a plan view of the parts disclosed by Fig. 15, with the carriage in its backward position.

Fig. 17 is a detail elevation of a roller and its frame which in practice is mounted on the carriage.

Fig. 18 is an end elevation of an article of food partially wrapped in a wrapper.

Fig. 19 is a side elevation of the parts disclosed by Fig. 18.

Fig. 20 is an elevation similar to Fig. 18, with an additional fold in the wrapper.

Fig. 21 is a plan view showing the wrapper completely folded around the article of food.

Fig. 22 is a detail plan view of a pair of grooved rollers for creasing the wrapper at the ends of the completed package.

Figure 3:
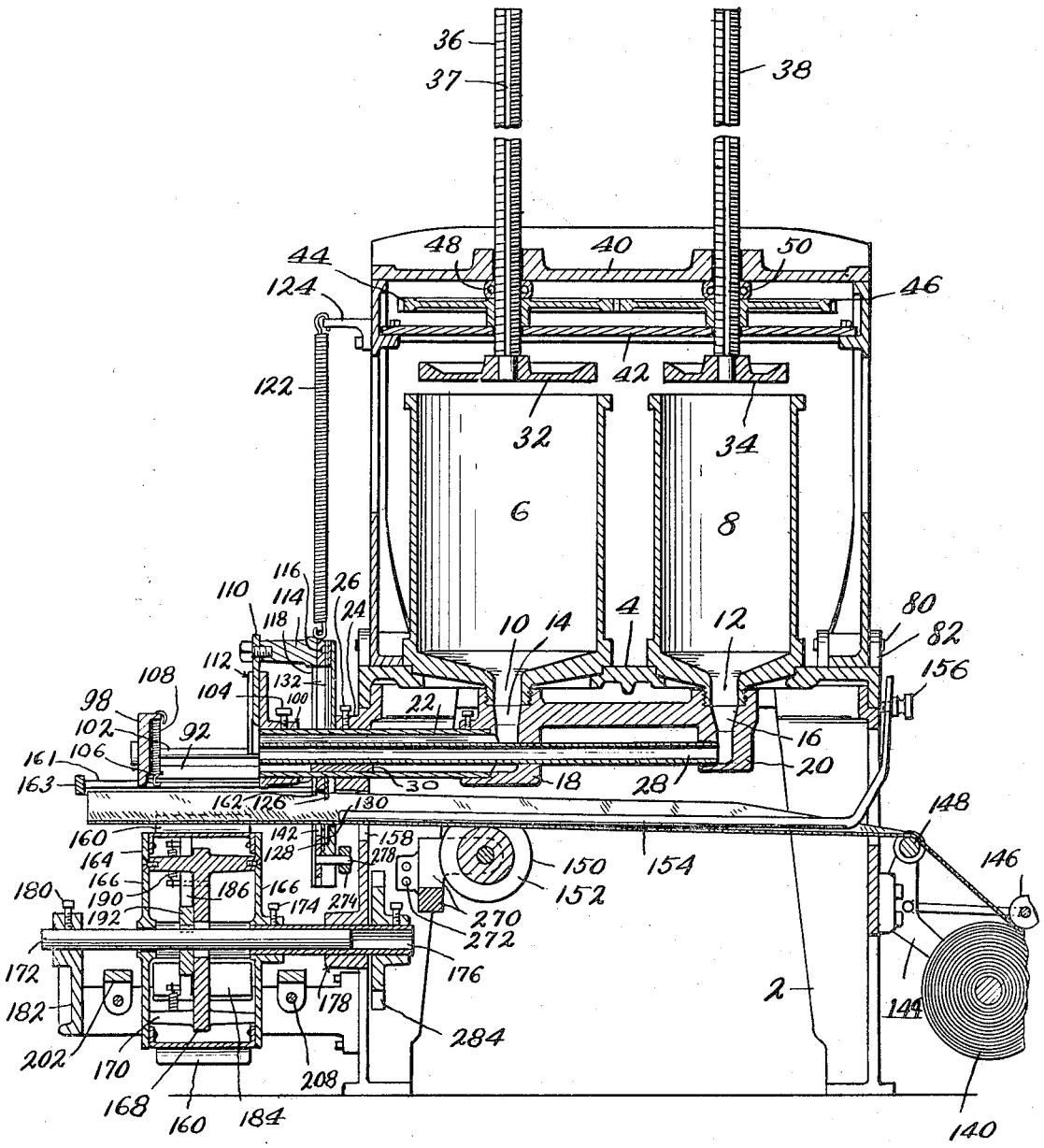
Fig. 3 is a vertical longitudinal section of the machine on line III—III of Fig. 2.

Referring now in detail to the various parts, 2 designates a table provided at its top 4 with removable receptacles 6 and 8, provided at their lower ends with discharge ports 10 and 12 communicating with ports 14 and 16 in bosses 18 and 20, respectively, depending from the table top 4, Fig. 3.

The boss 18 is provided with a nozzle 22 communicating with the port 14 and extending forwardly through an annular boss 24 at the front of the table 2, a set screw 26 being threaded into said boss 24 to firmly hold the nozzle 22 in place. The boss 20 is provided with a nozzle 28 extending forwardly and centrally through the boss 18 and the nozzle 22, its forward end terminating flush with the forward end of said nozzle 22, which projects a short distance from the boss 24. The forward portion of the nozzle 28 is provided with spacing fins 30, Figs. 8 and 9, to hold it centrally within the nozzle 22.

32 and 34 designate plungers for forcing the material out of the receptacles 6 and 8, into the nozzles 22 and 28, respectively. Said plungers 32 and 34 are provided with upwardly extending threaded stems 36 and 38. respectively, which pass through the top of a yoke 40 provided with a longitudinal bar 42 to support a pair of intermeshing cog wheels 44 and 46, threaded upon the plunger stems 36 and 38 and having the upper surfaces of their hubs in contact with ball thrust bearings 48 and 50, respectively, engaging the under surface of the top of the yoke 40. One of the plunger stems has right threads and the other left threads, so that they will move up an down together according to the direction in which the cog wheels 32 and 34 are rotated.

The plunger stems 36 and 38 have longitudinal grooves 37 and 39 to receive keys 41 one of which is shown in Fig. 10, which prevent said plunger stems from rotating with the respective cog wheels 44 and 46. The keys 41 fit in grooves 45 in the top of the yoke 40, which prevents said keys from moving laterally. The cog wheel 44 is driven by the cog wheel 46, which in turn is driven by a pinion 52 fixedly mounted upon a vertical shaft 54 provided with a fixedly mounted worm wheel 56 driven by a worm 58, fixedly mounted upon a drive shaft 60 provided with a sheave 62 driven by a belt 64, which in turn may be driven by any suitable means such as an electric motor, not shown.

Figure 1:
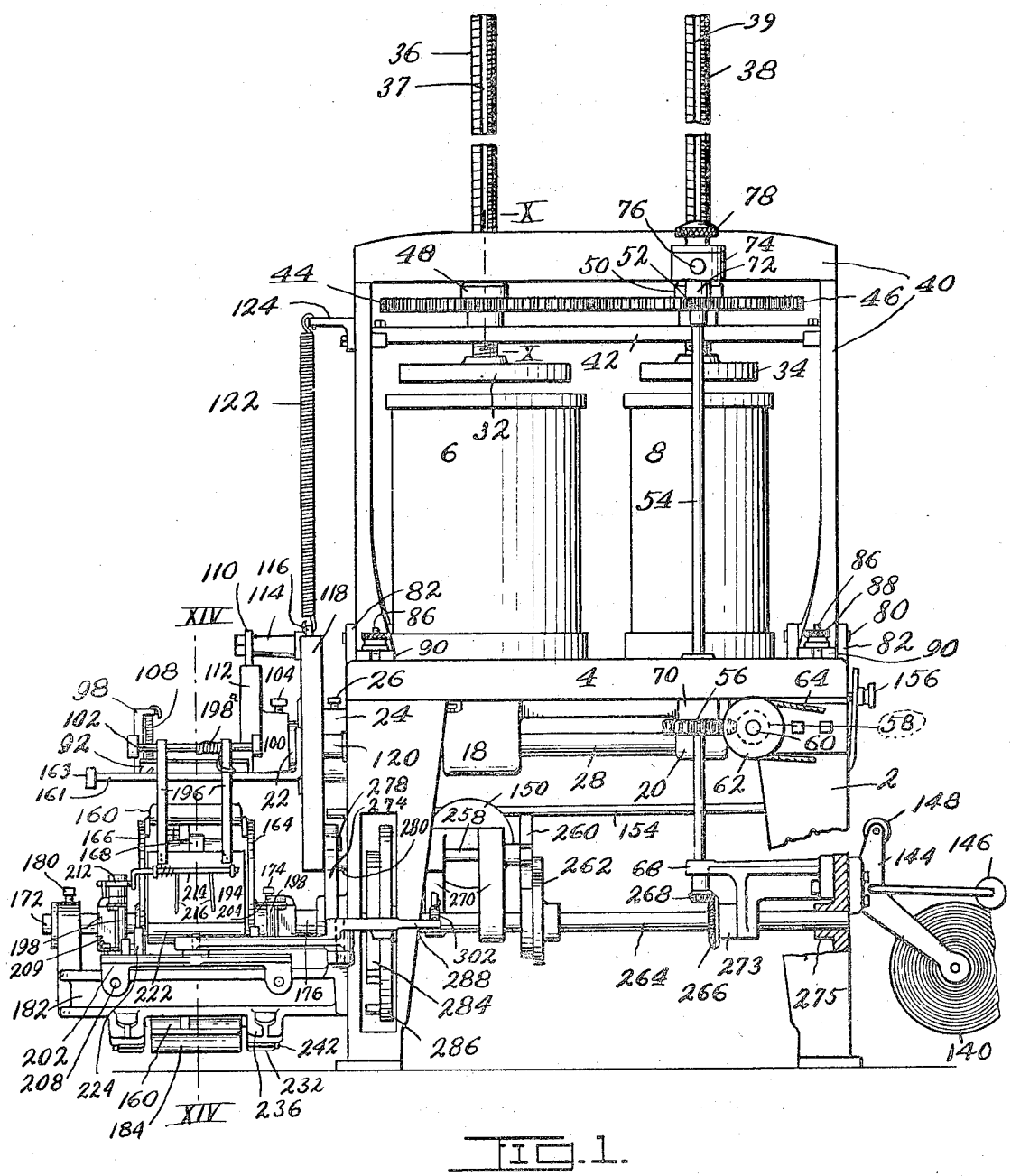
Fig. 1 is a side elevation of the machine.

The drive shaft 60 is mounted in a bracket 66 secured to the adjacent portion of the table 2. The vertical shaft 54 is journaled in bearings 68 and 70 on the table 2 and a removable bearing 72 carried by a bracket 74 at the upper portion of the yoke 40. The bearing 72 is held in active position in the bracket 74 by a set screw 76 and provided at its upper end with a knob 78, whereby it may be lifted out of engagement with the upper end of the shaft 54 after the set screw 76 has been loosened. By thus having the bearing 72 removably engage the upper end of the shaft 54, the yoke 40 may be swung backwardly to the position disclosed on Fig. 4, to carry its upper portion and the parts associated therewith away from the tops of the receptacles 6 and 8, so that the same may be readily supplied with material. In order that the yoke 40 may be swung backwardly as described, its lower end is mounted on pivots 80 carried by lugs 82 on the table top 4, backward movement of the yoke 40 being limited by integral stops 84 which contact the table top 4, as shown. When adjusted to normal position the yoke 40 is prevented from accidentally swinging backwardly by studs 86 projecting upwardly from the table top 4 and thumb nuts 88 threaded upon said studs 86 and adapted to bear upon the toes 90 of the yoke, Figs. 1 and 2.

The material is discharged from the nozzles 22 and 28 upon a tray 92 consisting of a pair of oppositely-disposed leaves 94 mounted on pivots 96 carried by brackets 98 and 100. The bracket 98 is supported by a pair of arms 102 secured to the bracket 100, which in turn is supported by the forward end of the nozzle 22 to which it is secured by a set screw 104, Figs. 1 and 2. The leaves 94 of the tray 92 are normally held in raised position, Figs. 11 and 14, against stops 106 by coil springs 108 secured at their lower ends to said leaves and at their upper ends to the upper ends of the bracket 98.

After the material has been forced outwardly upon the tray 92 the proper distance, it is cut off into a length of article A at the discharge ends of the nozzles 22 and 28 by a blade 110 reciprocably mounted in slideways 112 on the bracket 100. The blade 110 is secured at its upper end to an arm 114, Figs. 1, 2 and 3, which is secured to a plate 116 reciprocably mounted in slideways on a guide 118 secured to the adjacent end of the table by brackets 120. The plate 116 is normally held in raised position by a coil spring 122 secured at its upper end to a bracket 124 projecting from the adjacent end of the yoke 40. The plate 116 is provided at its rear side with a knife 126, which coacts with a stationary knife 128 in cutting wrappers B from a roll of paper 140 for the articles of food, as will hereinafter appear. The stationary knife 128 is secured to the lower front portion of the guide 118, Fig. 3, which has a projection to leave a groove 130 between said guide 118 and the knife 128 into which the lower portion of the knife 126 passes when cutting off the wrappers. The reciprocatory plate 116 and the knife 126 have registering slots 132 to prevent them from contacting with the nozzle 22, which extends through said slots.

The knives 126 and 128 have, substantially V-shaped cutting edges 134 and 136, respectively, to conform to the partially folded portion of the paper from which the wrappers are cut and to prevent lateral displacement of said paper while being cut. The free end of the paper roll 140 is carried forwardly through an opening 158 in the front of the table, through openings 142 in the plate 116 and the guide 118 and between knives 126 and 128. The roll 140 is mounted in a holder 144 at the rear of the table 2 and provided with a tensioning roller 146 to prevent said roll 140 from unwinding too rapidly. The holder 144 is also provided with a guide roller 148 over which the paper travels as it is carried forward step by step the length of each wrapper, by a feed roller 150. The feed roller 150 has a peripheral V-shaped groove 152 which coacts with a rod 154 in partially folding the paper longitudinally before it passes between the knives 126 and 128. The rod 154 also guides and holds the paper in frictional engagement with the feed roller 150, so that the same may positively feed the paper forward. The rear end of the rod 154 extends upwardly and is carried by a thumb screw 156 threaded into the table 2. By adjusting said thumb screw 156 forwardly it carries the upturned end of the rod 154 therewith, causing the forward portion of said rod to move downwardly and hold the paper in contact with the feed roller 150 with the desired friction.

Figure 2:
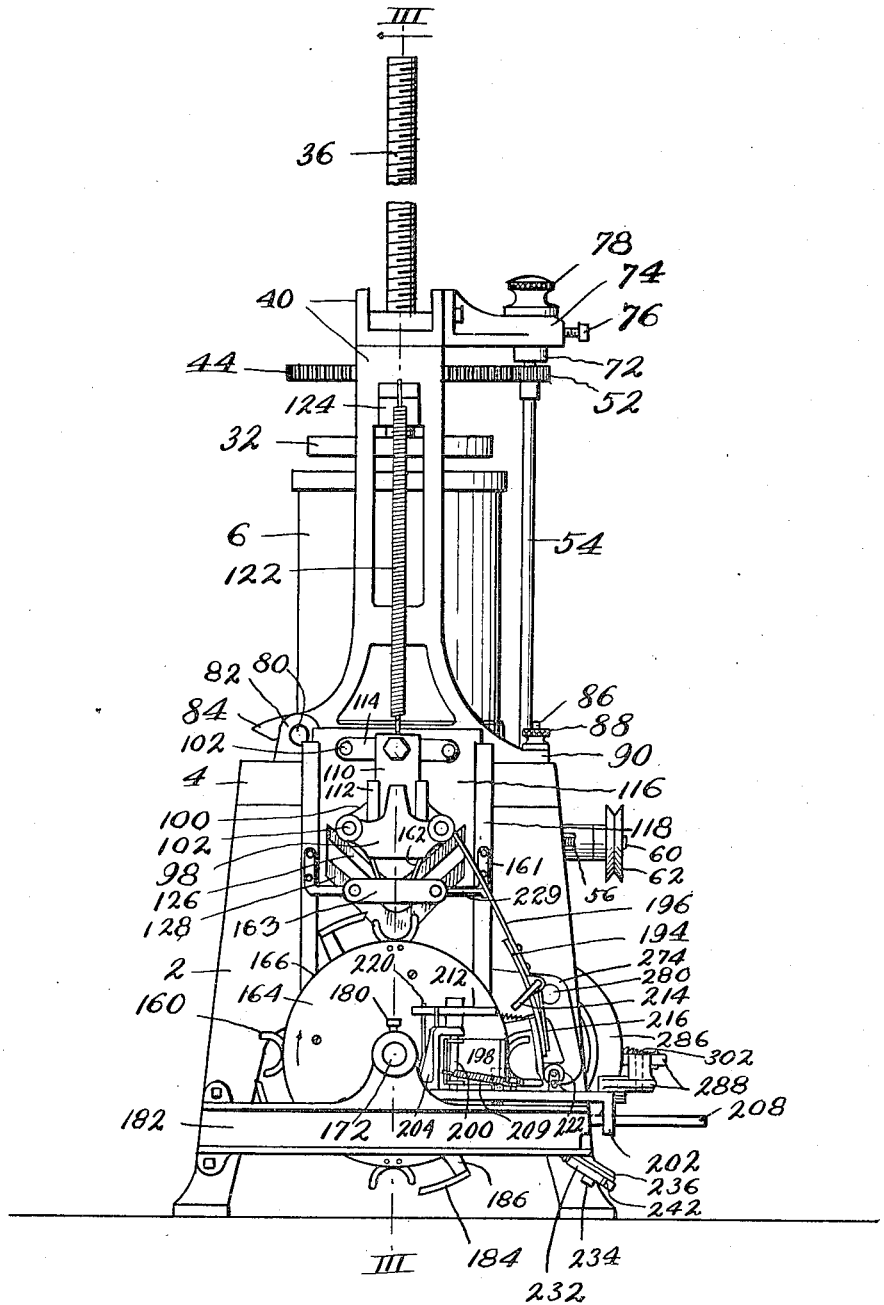
Fig. 2 is a front elevation of the machine.
Figure 4:
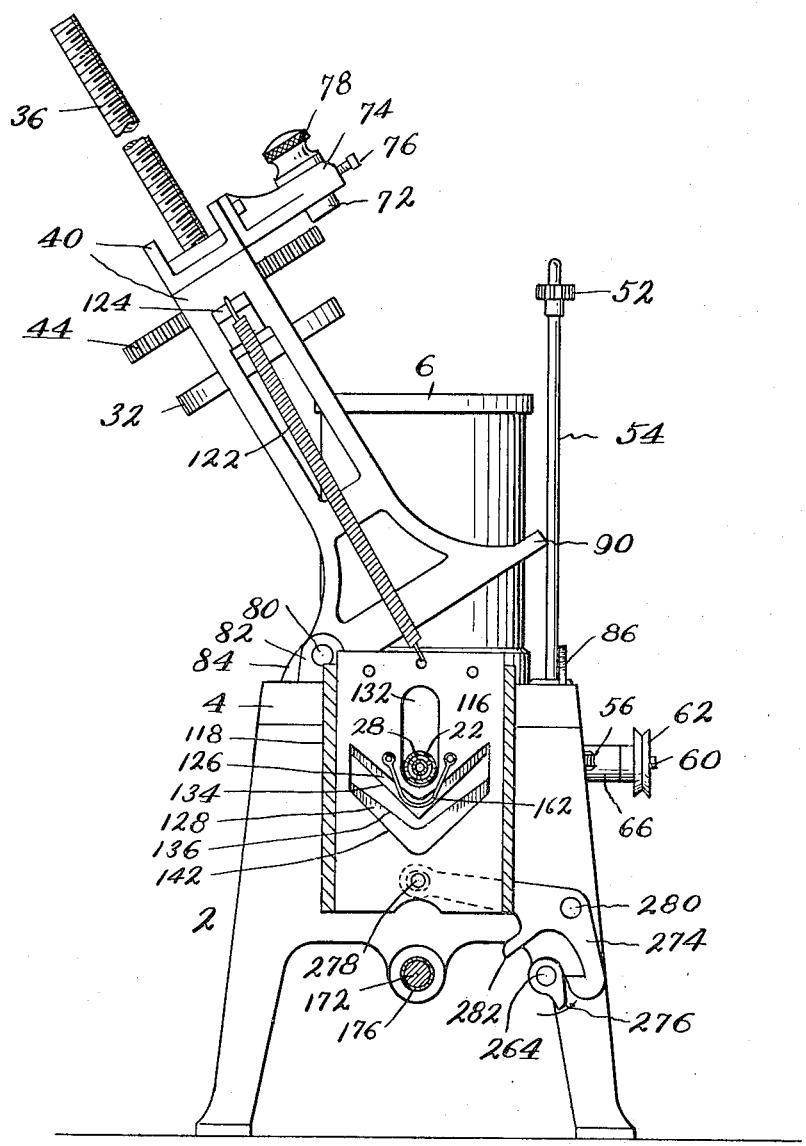
Fig. 4 is a front elevation partly in section with a yoke and associated parts swung to inactive position.
Figure 5:
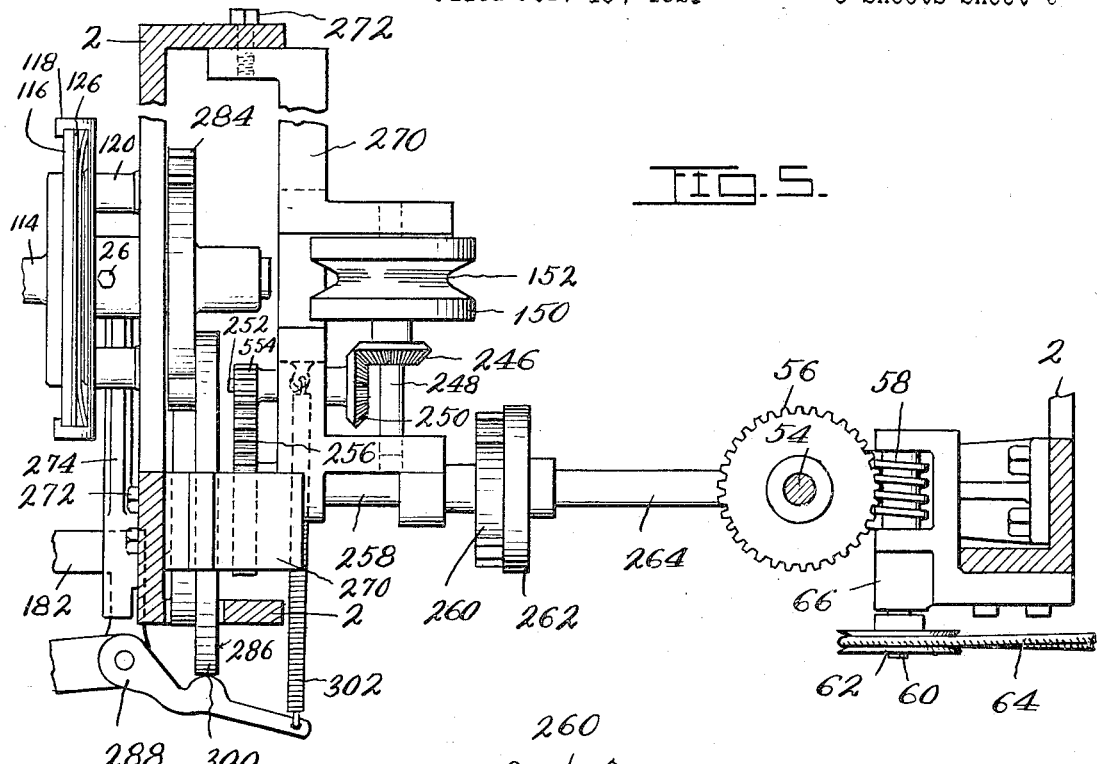
Fig. 5 is a plan view partly in section showing the major portion of the gear wheels and some of the associated parts employed in carrying out the invention.
Figure 6:
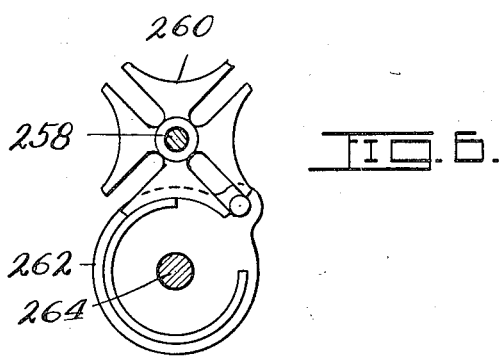
Fig. 6 is a side elevation of Geneva gearing employed in intermittently driving certain parts of the mechanism.
Figure 7:
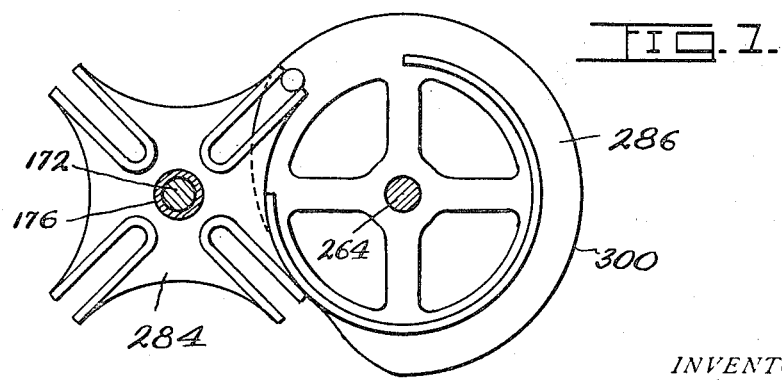
Fig. 7 is a side elevation of Geneva gearing and a cam for intermittently driving other parts of the mechanism.

After the paper has been fed forward a step by the feed roller 150, it is cut off at the proper time by the knives 126 and 128 and forced downwardly into a trough-shaped receiver 160 by a presser-foot 162 secured to the front of the plate 116, Figs. 2, 4 and 13. The blade 110 descends with the knife 126 and cuts off a length of the material forced from the nozzles 22 and 28. After the length or article A, is cut off it rests upon the leaves of the tray 92, which however, are soon opened to the position disclosed by Fig. 13, by the descending blade 110 to permit the article A to fall into the wrapper in the receiver 160. As the wrapper is forced down into the receiver 160 it passes between a pair of arms 161 and is thereby held in its partially folded position. The arms 161 are secured at their rear ends to the guide 118 and united at their forward ends by a transverse bar 163.

As disclosed more clearly on Figs. 13 and 14, four receivers 160 are provided in the present instance and spaced equal distances apart around a rotary carrier 164, consisting in the present instance of a pair of disks 166 spaced apart, and an intermediate member 168 having laterally extending arms 170 to which the disks 166 are secured. As disclosed more clearly on Fig. 3, one of the disks 166 is loosely mounted upon a stationary shaft 172, while the companion disk is fixed by a set screw 174 to a rotary tubular shaft 176 journaled in bearings 178 on the adjacent end of the table 2. One end of the stationary shaft 172 is supported by the tubular shaft 176, while its opposite end is secured by a set screw. 180 in a large bracket 182 secured to the adjacent legs of the table 2.

A folding device 184, Figs. 13 and 14, is associated with each receiver 160 and fixed to a lever 186 mounted upon a pivot 188 projecting from the intermediate member 168 of the carrier 164. The inner end of each lever 186 is yieldably held by a coil spring 190 in engagement with a stationary cam 192 fixedly mounted upon the shaft 172. After a receiver 160 receives an article A in its wrapper B, the carrier 164 is rotated a quarter of a revolution in the direction of the arrow, Fig. 13, which operation causes the associated folding device 184 to bring the margins of the wrapper B together, Fig. 18, by reason of the associated lever 186 moving upwardly on the high radius of the cam 192 as disclosed on Fig. 14. As the carrier 164 reaches the end of a quarter of a revolution, the margins of the wrapper are folded upward, Fig. 20, against the outer surface of the folding device 184 by a blade 194, yieldably held in the path of said folding device 184 by a pair of hangers 196 pivoted at their upper ends to one of the arms 102 and yieldably pressed towards the folding device 184 by a spring 198ª, Fig. 1. While in the last-mentioned position the ends of the wrapper B are folded, Figs. 16 and 21, over the blade 194 by a pair of pivoted blades 198 mounted upon pivots 200 extending vertically from the top of a carriage 202, provided with brackets 204 for supporting the upper ends of the pivots 200.

When the carriage is at its inward or forward position, Figs. 13 and 15, the blades 198 are held in inactive position by lugs 206 extending upwardly from the rails 208 upon which the carriage 202 is reciprocably mounted. As the carriage 202 moves outward or backward to the position disclosed by Fig. 16, the blades 198 are moved to active position to fold the ends of the wrapper around the back of the blade 194, by coil springs 209 connected at one end to the blades 198 and at their opposite end to screws or pins 210 secured in the top of the carriage 202.

Outward movement of the carriage 202 also causes an arm 212 to impinge against a crank on one end of a crank shaft 214. The arm 212 is mounted upon one of the pivots 200 and yieldably held in position by a spring 220 to contact the crank on the shaft 214, which is provided with fingers 216, which are rocked out of the way of the ends of the wrapper B when folded by the blades 192 against the back of the blade 194 as above stated. As the carrier 202 nears the end of its outward movement the crank on the shaft 214 slips off the recessed portion 217 of the arm 212 and permits the fingers 216 to spring inwardly and hold the folded ends C of the wrapper before the blades 198 move out of contact therewith.

By the time the carriage returns to its forward position and the foregoing folding operations are completed the carrier 164 starts on another quarter of a revolution during which travel the folded ends C of the wrapper B are pressed against the folding device 184 by a roller 222 to retain their folded position. The roller 222 is mounted in a U-shaped frame 224 pivotally mounted on the carriage 202 and yieldably drawn towards the folding device 184 by springs 226. After the folding device 184 moves downwardly past the roller 222 the latter is prevented from getting into the path of the following receiver 160 by stops 228 arranged in the path of the frame 224 and secured to the carriage 202. The blade 194 is also prevented from swinging too far forward by a stop 229 arranged in the path of one of the hangers 196.

As the wrapper B and its contents pass below the roller 222 the end-folds C of said wrapper B are given a final crease by a pair of rollers 230, slidably and rotatably mounted upon arms 232 mounted on pivots 234, carried by lugs 236 depending from the adjacent side of the bracket 182. Springs 238 normally hold the rollers 230 against stops 240 threaded on the free ends of the arms 232, which latter are yieldably held in engagement with stops 242 by a coil spring 244 connected at its ends to said arms 232. By thus yieldably mounting the rollers 230, they can be forced out of the path of the folding device 184 as the ends thereof pass between the grooved peripheries of said rollers 230 and at the same time the latter engage the wrapper with sufficient pressure to form permanent creases which prevent the ends of the wrappers from unfolding until opened by hand. Before the carrier 164 completes its second quarter of a revolution the folding device 184 holding the wrapped article in the associated receiver 160 is actuated by the cam 192 to uncover said receiver and permit said article to fall from said receiver into a suitable receptacle not shown.

The gearing for actuating the parts above described is best shown by Figs. 1, 3, and 5 to 7, inclusive, and will now be described in detail. The mechanism for actuating the feed roller 150 is proportioned to feed the paper faster than the material is fed from the nozzles 22 and 28, owing to the fact that each wrapper B must be longer than the article A in order to fold over the ends thereof as above described, and consists of a train comprising a bevel gear 246 fixed to the feed roller shaft 248, a bevel gear 250 intermeshing with the bevel gear 246 and fixed upon a shaft 252, a pinion 254 fixed upon the shaft 252, a large cog wheel 256 intermeshing with the pinion 254 and fixedly mounted upon a shaft 258 carrying a fixedly mounted Geneva gear 260, intermeshing with a companion gear 262 fixedly mounted upon a countershaft 264 provided with a fixedly mounted bevel gear wheel 266 continuously driven when the machine is in operation by a bevel gear 268 fixed upon the lower end of the vertical shaft 54, the driving means for which has heretofore been described. The shafts 248, 252, 258, and one end of the shaft 264 is journaled in bearings on a bracket 270, secured by screws 272 to the adjacent legs of the table 2. The other end of the shaft 264 is journaled in bearings 273 and 275, at the left of the table, Fig. 1.

The plate 116 which controls the knife 126 and the blade 110, is moved downwardly against the action of the spring 122 at the proper time by a lever 274, which is actuated by a cam 276 mounted upon the forward end of the shaft 264. The lever 274 has a pin-and-slot connection 278 with the back of the plate 116 and is mounted upon a fulcrum 280. After the cam 276 moves out of engagement with the lever 274 the plate 116 is immediately restored to its raised position by the spring 122 but should said plate 116 become stuck from any cause, so that the spring 122 could not start it up it is positively started by means of the cam 276 and the lever 274, which latter has a lip 282 in the path of the former.

The carrier 164 is rotated a quarter of a revolution as above-described, after receiving each article A with its wrapper B, by means of a Geneva gear 284 fixed to the rear end of the tubular shaft 176 and intermittently driven by a companion gear 286 fixed upon the shaft 264. The carriage 202 is moved to and fro with the folding mechanism carried thereby by means of a lever 288 fulcrumed on a pivot 290 and actuated by the cam face 300 on the gear 286, a coil spring 302 being employed to yieldably hold said lever 288 in engagement with said cam face 300.

From the foregoing description it will be understood that I have provided a machine which is well adapted for the purposes intended, and while I have shown and described the preferred construction, combination and arrangement of parts, I reserve the right to make such changes as properly fall within the spirit and scope of the appended claims.

Having thus described my invention, what I claim and desire to secure by Letters Patent, is:

1. In a machine of the character described, a rotary carrier, receivers spaced apart on said carrier to successively receive lengths of material and hold a wrapper for each length, folding devices on said carrier for partly folding each wrapper around a length of material, a reciprocatory carriage associated with the carrier, means on said carriage for cooperating with the folding devices in folding the ends of the wrappers over the ends of the respective lengths of material, and grooved rollers for creasing the end folds of the wrappers.

2. In a machine of the character described, a rotary carrier, receivers spaced apart on said carrier to successively receive lengths of material to be wrapped, mechanism for feeding a sheet to each receiver before the same receives each length of material, means for cutting said sheet into wrappers, folding devices on the carrier for partly folding each wrapper around a length of material, and means cooperating with said folding devices for folding the ends of the wrappers over the ends of the respective lengths of material.

3. In a machine of the character described, a rotary carrier, receivers spaced apart on said carrier to successively receive lengths of material to be wrapped, a grooved roller for feeding a sheet to each receiver before the same receives each length of material, a rod for holding the sheet in frictional engagement with said roller, means for adjusting said rod to regulate its pressure on the sheet, means for cutting said sheet into wrappers, folding devices on the carrier for partly folding said wrapper around a length of material, and means cooperating with said folding devices for folding the ends of the wrappers over the ends of the respective lengths of material.

4. In a machine of the character described, means for supporting a roll of paper, a peripherally grooved roller for feeding the paper from the roll and partially folding it longitudinally, means for holding the paper in frictional engagement with said roller and coacting therewith in partially folding the paper, and means for cutting the paper into wrappers.

5. In a machine of the character described, means for supporting a roll of paper, a peripherally grooved roller for feeding the paper from the roll and partially folding it longitudinally, a rod for guiding the paper and holding it in frictional engagement with the grooved portion of the feed roller, and means for cutting the paper into wrappers.

6. In a machine of the character described, means for supporting a roll of paper, means for feeding the paper from the roll and partially folding it longitudinally, a knife having a cutting edge converging to a central point, and another knife to coact with the first one in cutting the paper into wrappers.

7. In a machine of the character described, means for supporting a roll of paper, means for feeding the paper from the roll and partially folding it longitudinally, a knife having a cutting edge converging to a central point, and another knife having a substantially, V-shaped cutting edge to coact with the first knife in cutting the paper into wrappers.

8. In a machine of the character described, means for supporting a roll of paper, means for feeding the paper from the roll and partially folding it longitudinally, means for cutting the paper into wrappers, means for depositing an article of food in each wrapper as it is cut from the roll of paper, and means for folding each wrapper around the article of food deposited therein.

9. In a machine of the character described, means for supporting a roll of paper, means for feeding the paper from the roll and partially folding it longitudinally, and knives having cutting edges to conform substantially to the shape of the partially folded paper to cut the same into wrappers.

10. In a machine of the character described, means for supporting a roll of paper, means for feeding the paper from the roll and partially folding it longitudinally, a knife having a cutting edge converging to a central point, and another knife having a cutting edge diverging outwardly and upwardly from a central point to coact with the first knife in cutting the partially folded paper into wrappers.

In testimony whereof I affix my signature in the presence of two witnesses.

WILLIAM STRICKER.

Witnesses:
F. G. FISCHER,
L. J. FISCHER.